May 5, 1925.

R. D. EMMONS

ICE CREAM DISHING DEVICE

Filed May 15, 1924

1,536,199

Inventor
Ray Dilce Emmons

By Lester L Sargent
Attorney

Patented May 5, 1925.

1,536,199

UNITED STATES PATENT OFFICE.

RAY DILCE EMMONS, OF ASHLAND, OHIO.

ICE-CREAM-DISHING DEVICE.

Application filed May 15, 1924. Serial No. 713,577.

*To all whom it may concern:*

Be it known that I, RAY DILCE EMMONS, a citizen of the United States, residing at Ashland, in the county of Ashland and State of Ohio, have invented a new and useful Ice-Cream-Dishing Device, of which the following is a specification.

The object of my invention is to provide a novel dishing device adapted for the rapid handling of ice cream in containers to customers in quantities corresponding to the conventional size of cartons, that is, pints, quarts, etc.; and to provide a device which permits of handling the ice cream in a sanitary manner, and without waste of the cream. I attain these and other objects of my invention by the device illustrated in the accompanying drawings, in which—

Like characters of reference indicate like parts in each of the views.

Figure 1:
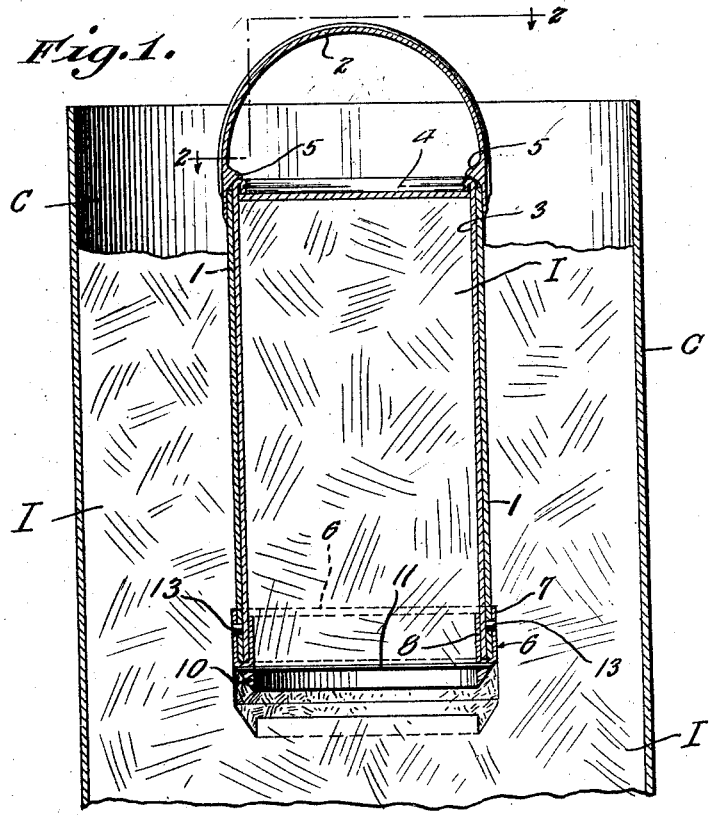
Figure 1 is a vertical section through a can of ice cream into which my device has been inserted and from which it is just beginning to be withdrawn, showing how it is used.
Figure 2:
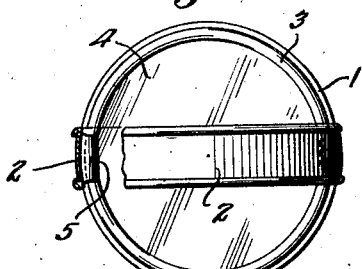
Fig. 2 is a horizontal section on line 2—2 of Fig. 1.
Figure 3:
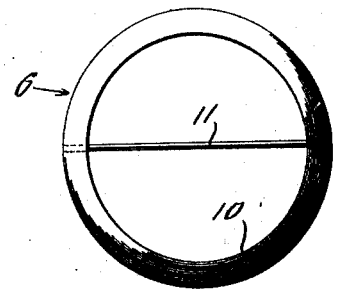
Fig. 3 is a bottom plan view of my device.

Referring to the accompanying drawings, I provide a preferably round barrel 1 of any suitable material, preferably metal, having a handle 2 affixed to it, the handle having opposite inwardly extending projections 5 adapted to engage the bottom 4 of a pasteboard or similar carton 3.

Figure 4:
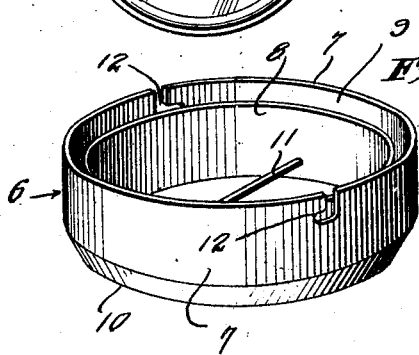
Fig. 4 is a detail perspective view of the detached circular end cap or covering 6.

I provide a cap or end covering 6 consisting of a circular outer wall 7 which is tapered toward and integral with the spaced inner wall 8. The space 9 between the walls 7 and 8 is sufficient to receive the lower end of the barrel 1 and of the carton 3 in the manner illustrated in Fig. 1. The outer wall 7 of cap 6 is provided with preferably opposite bayonet slots 12 adapted to receive correspondingly positioned studs or projections to temporarily lock the member 6 to the barrel 1, as shown in Fig 1. The circular end cap 6 is provided with a stiff wire or rod 11 affixed to and extending between opposite portions of the inner wall 8, approximately as shown in Figs. 1 and 4.

In using the device, cap 6 is detached from barrel 1 and a carton is inserted in the barrel until its bottom portion 4 abuts against the projections 5. The cap 6 is then applied and the projections 13 are engaged in the bayonet slots 12 locking the circular cap 6 to the barrel 1. The device is then plunged in the ice cream to its full length, filling the carton 3. Thereupon the device is rotated by the handle 2, a rigid cross-wire or rod 11 extending between opposite portions of inner wall 8 of the cap 6 functioning to cut the ice cream so that the cake or mass of ice cream contained within carton 3 will be withdrawn along with the carton when barrel 1 is withdrawn from the mass of ice cream I in the freezer or can C.

The device fills the carton without waste of cream and in a perfectly sanitary way. Five cartons can be filled with the device in the time required to fill one quart carton by the conventional prior modes of procedure.

Walls 8 and 9 of the end cap 6 are very thin, the wall 8 being only about one-sixteenth of the width or thickness of the wall of carton 3.

What I claim is:

1. In an ice cream dishing device, the combination of an open ended cylinder having a bail handle affixed at diametrically opposite points on the cylinder, said bail having inwardly extending projections to limit the movement of a carton in the cylinder, whereby to permit the facilitation of the ejection of the filled carton.

2. In an ice cream dishing device, the combination of an open ended cylinder, a bail attached to one end of the cylinder, inwardly extending projections at the same end of the cylinder adapted to limit the movement of a carton in the cylinder, a detachable double walled cap engageable over the other end of the cylinder, said cap having a sharp circular cutting edge alined with the inner wall of the cap and a cross rod on the cap, substantially as shown.

RAY DILCE EMMONS.